UNITED STATES PATENT OFFICE.

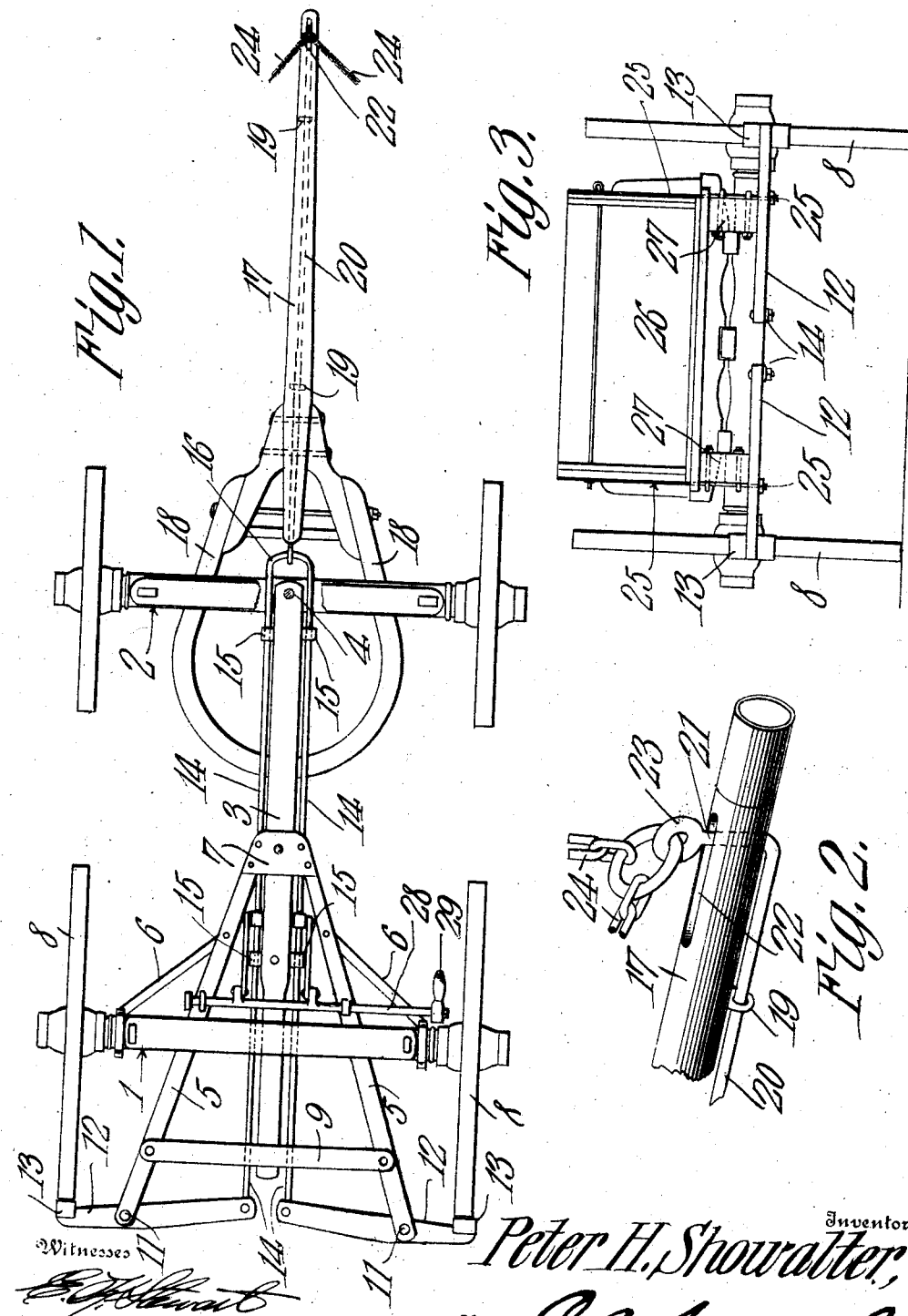

PETER H. SHOWALTER, OF NORTH RIVER, VIRGINIA.

VEHICLE-BRAKE.

No. 879,203.   Specification of Letters Patent.   Patented Feb. 18, 1908.

Application filed August 17, 1907. Serial No. 389,043.

*To all whom it may concern:*

Be it known that I, PETER H. SHOWALTER, a citizen of the United States, residing at North River, in the county of Rockingham and State of Virginia, have invented a new and useful Vehicle-Brake, of which the following is a specification.

This invention relates to vehicle brakes for use especially on farm wagons, but it is equally applicable on other forms of horse drawn vehicles.

The main object of this invention is to provide a simple, powerful and sure rear wheel brake that is automatically thrown into action, when the vehicle, to which it is applied, is on a down grade and the pole horses are holding back, the arrangement is such that the tighter the horses are held in the greater will be the degree of power applied to the wheels by the brake shoes. The brake device is also valuable on ordinary occasions as in the act of stopping the horses, the brake is simultaneously applied to the rear wheels and brings the vehicle to a halt.

In one form of construction, the rear hounds are extended back as far as the peripheries of the rear wheels, to which hounds the brake levers are attached. Another method is to pivot the brake levers to the rear of the wagon box by long vertical bolts reinforced by blocks or metal tubes outside the body and surrounding the bolts.

With these and other objects in view, the invention comprises certain novel combination, arrangement and construction of parts hereinafter described and definitely pointed out in the claims.

In the accompanying drawing:—Figure 1 is a top plan view of the running gear of a wagon with the improved brake mechanism applied thereto. Fig. 2 is a perspective view of the front end of the wagon pole showing a detail of the invention in connection therewith. Fig. 3 is a rear view of an ordinary wagon with the brake levers attached in a modified way to the rear of the body.

Similar numerals of reference are used to designate the same parts on all the figures.

Referring to Figs. 1 and 2 of the drawing, the numeral 1 indicates the rear axle, and 2 the front axle centrally pivoted to the forward end of the reach-bar 3 by the king bolt 4. The rear axle 1 is connected rigidly to the reach bar 3 by rear hounds 5, one on each side, fastened together and to the reach bar in front of the axle by a plate 7. The hounds diverge thence rearwardly past the rear axle to which they are fastened to a point about in line with the peripheries of the rear wheels 8. As a further means of strength, braces 6 extend from the ends of the axle 1 forward to the hounds and a bar 9 extends transversely from hound to hound near their rear ends. As will be observed, the hounds 5 terminate near the rear wheels in position to receive the fulcrum bolts 11 of the brake levers 12 carrying brake shoes 13 on their outer ends.

On each side of the reach bar 3 is a metal rod 14 parallel thereto and retained in place by loops or guides 15 attached to the reach. The rear ends of the rods 14 are each pivotally connected to the inner end of a brake lever 12 while at their forward ends they are connected together in front of the reach by an arc shaped loop 16 the axis of which is the center of the king bolt 4.

The pole 17 of the wagon is attached in the usual way to forward hounds 18 which latter are fastened to the front axle 2 through the center of which and the forward end of the reach bar 3 the king bolt 4 is placed. Below the pole 17 and suspended in supports 19 is a rod 20 its rear end loosely connected to the loop 16, and its forward end 21, bent up at right angles projects through a vertical slot 22 near the forward end of the pole. The rod 21 is finished with an eye 23 just above the pole to which are attached chains 24 leading to the collars of the pole horses.

In the modified form of the invention represented in Fig. 3 the rear wagon irons 25 extend down the outside of the box 26 against bearing blocks 27 and through the brake lever 12 to form pivots for said brake levers. When it is desired to stop a vehicle equipped with the above described brake, the horses are restrained or "pulled" thereby causing them to decrease their speed or come to a practical stop. This action of the horses draws the chains 24 and the rod 20 beneath the pole rearwardly. The connection of the rod 20 to the rods 14 through the loop 16 forces the latter rods backward and swings the brake rods against the rear wheels with greater or less force, depending upon the action of the horses, and brings the vehicle to a stop in a very short time. The object of curving the loop 16 from the same axis as the king bolt is to cause the rod 20 to remain in the same position whether the wheels are turned to the right or left. In place of the rod 20 for operating the rods 14, the pole or tongue 17 may be made to slide in the forward hounds and be connected to the loop 16.

If desired the brake may be operated by a hand mechanism such as represented in Fig. 1 where a brake shaft 28 extends across the rear hounds in front of the rear axle, and has a lever arm 29 attached thereto extending above the wagon body. Short arms on the brake shaft 28 are connected by links to each rod 14 for moving them when the brake arm 29 is manipulated.

I claim:—

In a brake for vehicles, a brake lever for each rear wheel pivotally attached at an intermediate point to the rear end of each rear hound, a longitudinal rod attached to the inner end of each brake lever, said rods extending forwardly beyond the front axle and joined by a curved loop, and a slidable rod attached to said loop and extending near the forward end of the pole and having means thereon for attaching said rod to the collars of the pole horses.

In testimony that I claim the foregoing as my own I have hereto affixed my signature in the presence of two witnesses.

PETER H. SHOWALTER.

Witnesses:
 JNO. M. FLORY,
 D. O. DICHERT.